June 24, 1930. R. LEE 1,767,146
VARIABLE SPEED ELECTRIC MOTOR SWITCH
Filed Aug. 4, 1926
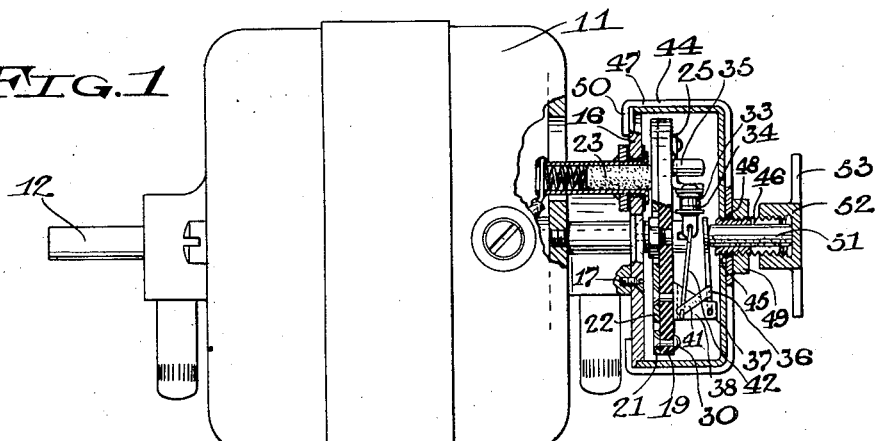
WITNESSES
INVENTOR
Royal Lee
By
ATTORNEY Patented June 24, 1930

1,767,146

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

VARIABLE-SPEED ELECTRIC-MOTOR SWITCH

Application filed August 4, 1926. Serial No. 127,041.

The invention relates to variable speed electric motors.

An object of the invention is to provide an electric motor in which the speed of rotation can be controlled over a wide continuously variable range without requiring rheostat elements.

Another object of the invention is to provide an electric motor speed controller in which the wear on speed-adjusting parts is minimized.

A further object of the invention is to provide a speed-controlling mechanism which can be mechanically actuated at a distance from the motor, thereby obviating rheostatic control.

A further object is to provide an electric motor of the series or universal type with speed control elements permitting the use of motor windings of lesser resistance than is possible in conventional types of motors of equal size, thereby affording greater power capability.

A further object is to provide an electric motor which is controlled as to speed by periodically interrupting the load circuit at relatively movable contacts, and including an auxiliary field winding bridging the interrupter contacts to lessen the wear on the contacts and to insure smooth motor operation at the lower speeds.

The invention further consists in the several features hereinafter set forth and more particularly defined by the annexed claims.

In the accompanying drawings,

Fig. 1 is a side elevation of a variable speed motor embodying the invention, parts being broken away and parts being shown in section;

Fig. 2 is a front end view showing a rotary breaker mechanism including a centrifugal circuit breaker and its controlling linkage;

Fig. 3 is a front end view of the brush gear for the circuit breaker;

Fig. 4 is a rear view of the breaker disk showing the collector rings;

Fig. 5 is a schematic wiring diagram for the motor;

Fig. 6 is a side elevation of the motor showing a modified form of motor control, and Fig. 7 is a similar view showing another form of motor control.

In these drawings, 10 designates a motor having a housing 11 in which is journaled a shaft 12 carrying an armature 13. The motor is of the series or universal type including an armature winding 14 connected in series with field windings 15.

A disk 16 is secured by screws 17 to one end of the motor housing and has a central opening 18 admitting the armature shaft 12. If desired, the disk 16 may form an integral part of the motor housing instead of being separate as shown. A rotary breaker disk 19 of insulating material is secured to the end of the armature shaft in any suitable manner, as by a screw 20, and is driven by the shaft. The side of the breaker disk 19 facing the stationary disk 16 is provided with concentric collector rings 21 and 22, against which respectively bear spring-pressed brushes 23 and 24 mounted in, but insulated from, the disk 16. The outer face of the breaker disk carries spaced angle brackets 25 and 26, which are electrically connected to the collector rings 21 and 22, respectively, by rivets 27, which also secure the several parts together in assembled relation. A balancing counterweight 28 is secured at an opposite edge of the disk 19 by rivets 29, which also form attaching members for the collector ring 21. In addition other rivets 30 may be employed to anchor the collector rings to the disk.

A pair of parallel flat springs 31 and 32 disposed side by side and facing each other have their adjacent ends secured to the brackets 25 and 26 respectively and carry co-operating contacts 33 and 34 near their free ends. Under the influence of centrifugal force the contact-loaded free end of the spring 31 tends to be deflected outwardly but is limited against excessive movement by a stop pin 35 carried by the insulating disk. A bell-crank lever 36 is provided with trunnions 37 pivotally mounted in the projecting arms of a U-shaped bracket 38 secured to the disk 19 by rivets 39, which also secure the collector ring 22 to the disk. The bracket and lever are each preferably formed of sheet metal. The bell-crank lever 36 is pivotally mounted to swing in an axial plane and one free end forms an ear 40 disposed at and substantially normal with the axis of the armature shaft. The other arm 41 of the bell-crank projects towards the disk 19 and carries one end of a link 42 which has its other end pivotally mounted in a bracket 43 secured to the contact spring 32. The angular position of the bell-crank lever thereupon determines the position of the contact 34 on the spring 32 with respect to the contact 33.

The outer periphery of the stationary disk 16 is rabbeted to receive the edge of a cup-shaped casing 44 enclosing the breaker disk 19. The cup 44 is provided with a central opening 45, into which is threaded a bushing 46 having a split outer end to provide resiliency. A C-shaped clamp 47 has a central aperture 48 passing over the bushing 46 and is secured thereto by a lock nut 49, which also secures the bushing 46 against relative movement with respect to the casing 44. The free ends 50 of the C-shaped clamp 47 engage behind the stationary disk 16 to clamp the casing 44 in place on the disk.

A pin or plunger 51 is disposed within the bushing 46 in substantial axial alignment with the armature shaft 12 and is axially movable within the bushing by any suitable means, such as by an internally threaded cap 52 carried on the outer end of the bushing 46 and provided with projecting wings 53 to afford a finger hold. The pin or plunger 51 is preferably of fiber or other suitable wear-resisting material, such as carbon, if properly insulated, and has its inner end bearing on the ear 40 of the bell-crank 36 in order to adjust the position of the bell-crank, and thereby through the intermediate link 42 vary the relative position of the contact 34 with respect to the contact 33. The engagement of the plunger 51 with the ear 40 of the bell-crank is localized at the axis of rotation, so that very little wear will take place.

In that form of the invention shown in Fig. 6 the threaded plunger-adjusting cap 52 is not used and is replaced by a knee-operated lever 54 pivotally mounted at its upper end on a bracket 55 above the plunger, the lever extending below the motor. A tension spring 56 urges the lever 54 towards the motor and the lever bears on the plunger 51 to press it inwardly and through the intermediate linkage open the contacts 33 and 34. By knee pressure on the lever in the direction of the arrow the plunger 51 is permitted to move outwardly to vary the relative position of the contacts 33 and 34. This form of control is suitable for sewing machine motors and replaces the usual rheostatic control.

In the modified form of the invention shown in Fig. 7 a tubular casing 57 is secured in axial relation to the breaker casing 44 and carries a flanged plunger 58 engageable with the plunger 51 and under urge of a surrounding compression spring 59 by which the plunger 51 is pressed inwardly to open the contacts 33 and 34 on the breaker disk. A Bowden wire 60 is secured to the plunger 58 and is carried within a flexible tubular casing 61 secured to a base 62. The base carries a movably mounted pedal 63 attached to the Bowden wire 60 to vary the position of the plunger 58 thereby through the intermediate linkage vary the position of the contacts 33 and 34 on the breaker disk. This form of control is also suitable for use with sewing machine motors in addition to motors for various other types of service. The Bowden wire may also be actuated in other ways than by the pedal illustrated.

The breaker contacts 33 and 34 on the rotary breaker disk 19 are included in the load circuit of the motor and separate under the influence of centrifugal force to periodically break the motor circuit and thereby control the speed of the motor by controlling the mean value of load current. In order to lessen wear on the points a condenser 64 is connected across the brushes 23 and 24. This condenser or other equivalent device is useful when the motor is operated on direct current but is not so necessary for operation on alternating current. In order to further minimize the wear on the contacts a relatively high resistance field winding 65 is also connected across the brushes 23 and 24, preferably through a switch 66. The field winding 65, which is cumulative with respect to the field winding 15, receives current when the breaker points are open and is provided for purposes hereinafter described.

In the schematic wiring diagram of Fig. 5 the armature 14 is interposed between the field windings 15 which are connected to the supply mains 67 and 68. The brush 23 bearing on the breaker disk is connected by a conductor 69 to one end of one field winding 15 and the companion brush 24 is connected to the armature by a conductor 70. The contacts 33 and 34 of the breaker disk are thus connected between one end of one field winding 15 and the armature 14 to be directly in the load circuit. By placing the breaker contacts in this location, the field windings will form choke coils or reactors in both line conductors serving to prevent or minimize the transmission to these conductors of inductive disturbances originating at the breaker. In this manner, the motor may be operated in the close vicinity of radio-receiving apparatus without impairing the operation of such apparatus.

When the motor is at rest the centrifugally influenced contact 33 is urged by its supporting spring 31 towards the contact 34 and engages this contact unless the latter contact is moved by the bell-crank 36 to the inner limit of its travel, in which event the contacts remain separated and thereby form a motor-controlling switch. With voltage applied to the mains 67 and 68 the contact 34 may be moved into engagement with the contact 33 by outward axial movement of the plunger 51, the supporting spring 32 for the contact 34 serving to move the contact when permitted to do so by the changed position of the bell-crank 36. As soon as the contacts 33 and 34 engage a motor circuit is established through the conductors 69 and 70 leading to the brushes 23 and 24 of the breaker disk and the motor thereupon starts in operation. As the motor accelerates the spring-mounted contact 33 on the breaker disk is urged outwardly under the influence of centrifugal force to break the motor circuit and thereby cause the motor speed to drop slightly and permit the contacts to again meet and repeat the cycle. In practice the fluctuation of speed is very slight and hardly noticeable. The contact 34 is urged by its supporting spring 32 towards the spring-mounted contact 33. Under the influence of centrifugal force the contact 34 tends to be deflected in the same direction as the contact 33 but is restrained against deflection by the link 42 which is connected to the bell-crank lever 36 controlled as to angular position by the plunger 51. The position of the contact 34, however, may be varied over a continuous unbroken range in accordance with the angular position of the bell-crank lever 36 so that the contacts 33 and 34 can be made to open at any desired motor speed and thereby permit motor operation over a wide continuously variable range. The auxiliary field 65 which is shunted across the contact points is employed at the lower motor speeds to provide more quiet operation and to lessen the wear on the contact points, as the breaks of the contacts will then be less frequent. The resistance and inductance of the field is preferably less than that in the armature and the armature may more closely approach saturation than the field.

The centrifugally-influenced spring-mounted contact 33 is free of mechanical connection with the speed adjusting mechanism, this mechanism being connected only to the other spring-mounted contact 34. The outward centrifugally-influenced deflection of the spring 32 carrying the contact 34 introduces an opposing force acting on this spring-mounted contact and thus substantially equalizes the pressure on the controlling plunger 51 throughout the operating speed range of the motor. This relation of parts obviates excessive pressure on the controlling plunger at high motor speeds. The contact-carrying springs 31 and 32 are normally urged toward each other under spring pressure in order to compensate for contact wear and to insure engagement of the contacts in the absence of sufficient centrifugal force to separate them.

In a series or universal motor of conventional type, which is widely variable in speed according to load by virtue of its series characteristics, it has heretofore been necessary to employ comparatively high resistance motor windings in order to limit the speed of the motor and to prevent the armature from running away to destruction under no-load conditions. In order to obtain reasonable amounts of power in a small compass it has been the object of designers of this conventional type of motor to keep the no-load speed as high as practicable, so that the motor when under load will still rotate at a fairly high speed after slowing down to develop the required torque. In the motor of the present invention the speed is limited by the centrifugally-operated breaker mechanism which controls the load circuit so that the motor windings 14 and 15 may be of lower resistance than has heretofore been possible and are then less expensive and more rugged in character. In practice the motor windings may be 10% to 20% lower in resistance for continuous service motors and about 40% lower for intermittent service motors. The lower resistance motor windings in turn lead to the production of substantially increased power over that usually obtained in a motor of ordinary construction having similar physical dimensions. At one extreme adjustment the circuit-breaker will limit the speed of the armature at a safe upper limit under no-load conditions, and the speed will not drop appreciably when a load is imposed as in ordinary series motors but continues at substantially the same speed at normal loads because the lower resistance motor windings permit a larger current to flow. The higher speed and heavier current result in a substantial gain in power with no appreciable increase in heat losses. The cooling is also somewhat improved at the higher operating speed.

Fractional horse power motors embodying the invention have many applications, among which may be noted sewing machines, projectors and cameras, small machine tools, and dental engines. Some of these applications require constant, although suitably adjusted, motor speed, which has not heretofore been available in series or universal motors capable of operation on either direct or alternating current, as many conditions require. A constant, although suitably adjusted, speed under variable load is also of considerable advantage and is not obtainable with rheostatic control. This feature is particularly useful in the case of a motor-driven sewing machine, when careful stitching is to be done at low speed and where the resistance to sewing is variable. Under conditions of rheostatic control to obtain low motor speed in this service the variable sewing resistance will cause considerable variation in the speed of the motor, and where a momentary high sewing resistance is encountered the motor may come to a stop. Where remote rheostatic control has heretofore been used the Bowden wire control illustrated in Fig. 7 possesses the same convenience and is less expensive in construction.

What I claim as new and desire to secure by Letters Patent is:

1. In a centrifugal switch, the combination of a rotary member, a pair of relatively movable resiliently mounted contacts carried by said member and separable under the influence of centrifugal force, means for conducting electric current to said contacts, and means including an actuating member movable along the axis of said rotary member for adjusting the position of one of said contacts to predetermine the speed of rotation at which the other resiliently-mounted contact will be centrifugally displaced from said first-named contact.

2. In a centrifugal switch, the combination with a rotary disk, a pair of relatively movable contacts mounted on said disk and separable under the influence of centrifugal force, means for conducting electric current to said contacts, a lever movably mounted on said disk and operatively connected to one of said contacts, spring means opposing the centrifugal displacement of the other contact, and a movable member bearing on said lever to adjust the position of said lever-controlled contact for predetermining the speed of rotation at which said contacts will separate.

3. In a centrifugal switch, the combination of a rotary disk, a pair of relatively movable contacts carried by said disk and separable under the influence of centrifugal force, a bell-crank lever pivotally mounted on said disk, a link connecting one of said contacts with one arm of said lever, spring means opposing the centrifugal displacement of the other contact, and a control member movable along the axis of said disk and engageable with the other arm of said lever to determine the angular position of said lever and to thereby predetermine the speed of rotation at which said contacts will separate.

4. In a centrifugal switch, the combination of a centrifugally-operated circuit breaker including relatively movable contacts, means including a member movable to change the relative position of said contacts for determining the rotative speed at which said circuit breaker will operate, and actuating means for said member including a resilient wire operatively connected to said member.

5. In a centrifugal switch, the combination of a centrifugally-operated circuit breaker including relatively movable spring-urged contacts, means including a movable member operative to vary the pressure of said contacts for changing the speed of rotation at which said contacts will separate, and actuating means for said member including a flexible cord operatively connected to said member.

6. In a centrifugal switch, the combination of a rotary member, a pair of relatively movable co-operating contacts mounted on said rotary member, spring means opposing the centrifugal displacement of one of said contacts, means for conducting electric current to said contacts, and means including an actuating member movable along the axis of said rotary member for adjusting the position of the other of said contacts to determine the speed of rotation at which said contacts will separate.

7. In a centrifugal switch, the combination of a rotary member, a pair of relatively movable co-operating contacts mounted on said rotary member, spring means opposing the centrifugal displacement of one of said contacts, a second spring means opposing the centrifugal displacement of the other of said contacts, means for conducting electric current to said contacts, said means including an actuating member movable along the axis of said rotary member for adjusting the position of said last-named contact to determine the speed of rotation at which said contacts will separate, said centrifugal force-opposing spring means acting on said last-named contact serving to prevent increased axial thrust on said actuating member at high rotative speeds.

8. In a centrifugal switch, the combination of a rotary disk, a pair of relatively movable co-operating contacts mounted on one face of said disk and being relatively displaceable under the influence of centrifugal force, spring means opposing the centrifugal displacement of one of said contacts, means for conducting electric current to said contacts, a bracket projecting from the face of said disk, a lever pivotally mounted on said bracket and having an operative connection with the other of said contacts, and an actuating member movable along the axis of said rotary member and engageable with said lever for adjusting the position of said last-named contact to determine the speed of rotation at which said contacts will separate.

9. In a centrifugal switch, the combination of a rotary member, a pair of resiliently mounted members mounted on said rotary member, a pair of co-operating contacts respectively carried by said resiliently mounted members, said resiliently mounted members opposing the centrifugal displacement of said contacts, means for conducting electric current to said contacts, and means including an actuating member movable along the axis of said rotary member for adjusting the position of one of said contact-carrying members to determine the speed of rotation at which said contacts will separate.

10. In a centrifugal switch, the combination of a rotary member, a pair of leaf springs anchored on said rotary member, a pair of co-operating contacts respectively carried by said springs, said springs opposing centrifugal displacement of said contacts, means for conducting electric current to said contacts, and means including an actuating member movable along the axis of said rotary member for adjusting the position of one of said contact-carrying springs to determine the speed of rotation at which said contacts will separate.

In testimony whereof, I affix my signature.

ROYAL LEE.

CERTIFICATE OF CORRECTION.

Patent No. 1,767,146.     Granted June 24, 1930, to

ROYAL LEE.

It is hereby certified that error appears in the printed specification of the above numbered patent requiring correction as follows: Page 2, line 81, after "58" insert the word and; page 4, line 104, claim 7, for the word "said" second occurrence read and; and that the said Letters Patent should be read with these corrections therein that the same may conform to the record of the case in the Patent Office.

Signed and sealed this 5th day of August, A. D. 1930.

(Seal)     Wm. A. Kinnan,
Acting Commissioner of Patents.